G. VAN DAAM.
CARBURETER.
APPLICATION FILED MAY 2, 1914.
1,263,967.
Patented Apr. 23, 1918.
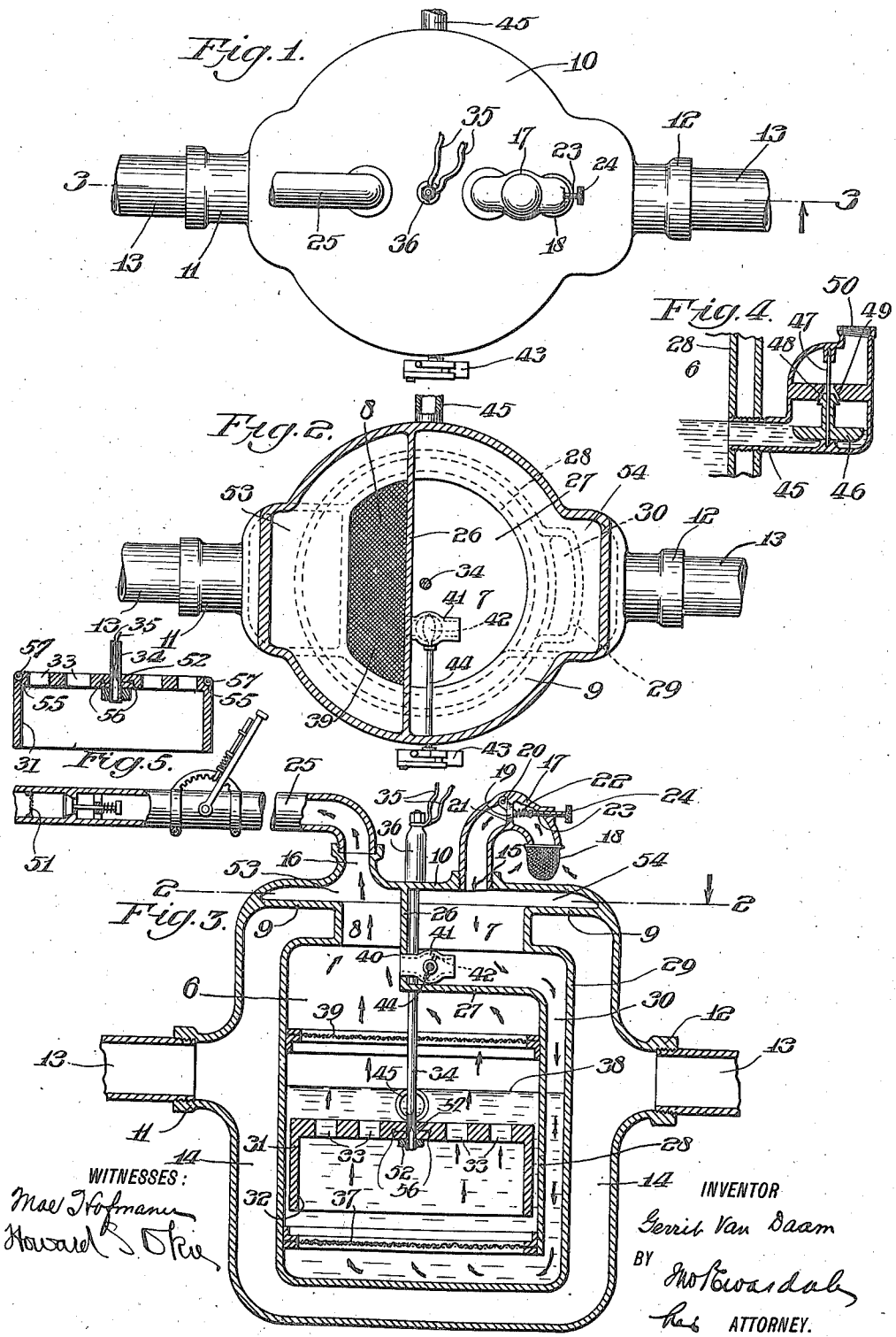
WITNESSES:
Mae Hofmann
Howard S. Okie
INVENTOR
Gerrit Van Daam
BY
Jno Eswardale
ATTORNEY.

UNITED STATES PATENT OFFICE.

GERRIT VAN DAAM, OF BUFFALO, NEW YORK.

CARBURETER.

1,263,967. Specification of Letters Patent. Patented Apr. 23, 1918.

Application filed May 2, 1914. Serial No. 835,809.

*To all whom it may concern:*

Be it known that I, GERRIT VAN DAAM, a citizen of the United States, residing at Buffalo, in the county of Erie, State of New York, have invented a new and useful Carbureter, of which the following is a specification.

My invention relates to improvements in carbureters for forming a combustible mixture.

My invention comprises in a compact, self-containing structure, a tank or fuel container, means for heating the fuel contained in said tank, means for heating the air delivered into the fuel, means for heating the resultant fuel vapors, adjustable means for delivering pre-heated air into said vapors to vary the richness of the mixture, means for effecting the preliminary heating of the fuel within the tank, and other details of construction.

Referring to the drawings which illustrate merely by way of example a suitable embodiment of my invention—
Figure 1 is a plan view of my improved carbureter.

Fig. 2 is a section on line 2—2 of Fig. 3.

Fig. 3 is a section on line 3—3 of Fig. 1.

Fig. 4 is a section of the fuel supply controlling means.

Similar numerals refer to similar parts throughout the several views.

My improved carbureter is especially adapted for use with the internal combustion engine of an automobile, especially where the employment of a cheaper fuel than gasolene is desired and the space for forming the combustible mixture is limited.

The tank or receptacle 6 adapted to contain a body of liquid fuel such, for example as kerosene, is provided with a centrally disposed top opening divided into separate openings or chambers 7 and 8 by wall or partition 26 depending from wall 10 and extending diametrically across the carbureter. Tank 6 is suspended from the annular wall 9 projecting inwardly from wall 10 which forms a surrounding jacket on all sides of the fuel tank. Wall 10 is suitably formed and apertured at 11 and 12 to receive the exhaust pipe 13.

It will be understood that the passage of the hot exhaust gases through space 14 surrounding tank 6 will serve to heat up the fuel body in the tank and to maintain the same in a heated condition. It will also be understood that, if desired, the circulating cooling system of the engine might be employed within space 14 as the heating medium.

Wall 10 is also provided, above chamber 7, with inlet aperture 15 for the supply of air, and above chamber 8 with fuel vapor outlet aperture 16 into which fits pipe 25 leading to the engine cylinder. Pipe 25 is suitably valved as shown in Fig. 3 and is provided with screen 51 to prevent back firing.

The curved pipe section 17 is threaded into inlet opening 15 and is provided at its outer end with screen cap 18 to prevent dust and dirt from being taken in with the air. Automatic valve 19 is hinged within pipe 17 at 20 and is adapted normally to engage valve seat 21 under tension of spring 22 which is secured at one end to the valve and at the other end to rod 23. Rod 23 is threaded to pipe 17 as shown and is provided with knurled element 24 for manual operation to control the tension of spring 22 and, consequently, the air supply through the valve.

Wall 26, suspended as above stated from the top of the carbureter, has the horizontally extending extension 27, and the vertically extending extension 28 forming with wall 29 of tank 6, the passage 30 leading from chamber 7 to the bottom of the fuel tank. Passage 30 conforms to the contour of adjacent walls 28 and 29, and permits the thorough heating of the incoming air from valve 19 by the heating medium in space 14.

As means for effecting a preliminary heating of the fuel body when it is desired to start the engine from the cold state, I provide the electric heater 31 conforming to the contour of tank 6 and provided with the depending marginal flange 32 parallel with the side walls of tank 6, and with apertures 33 for the passage of the gaseous vapors. Heater 31 is held in place within tank 6 by pipe 34 threaded through the heater and provided on its lower end with nut 52. This pipe also serves as a conduit for feed wires 35 connected with plug 36. It will be understood that the liquid fuel inclosed within the circular depending marginal flange 32 and immediately above the heater may be quickly heated by the passage of the electric current through the heater, to a degree sufficient to vaporize the hydrocarbon when air is delivered beneath screen 37. The passage through pipe 13 and space 14 of the exhaust gases from the engine will then quickly heat up tank 6 and the incoming air. The use of the electric heater may then be dispensed with.

In the operation of the device, upon the suction stroke of the engine piston, fresh air is drawn through screen 18 and manually adjustable spring-controlled valve 19, through chamber 7 and down through space 30 and into the fuel body, the level of which is indicated at 38. As the indrawn air passes between walls 28 and 29 it is in close proximity to chamber 14 and is consequently raised to a high temperature. It will be understood that in passing into the fuel body the air first passes through any portion of the fuel which may be present between walls 28 and 29 during the suction stroke of the piston; which fuel will have been thoroughly heated by its proximity to space 14. The passage of the air through screen 37 serves to break up the air thoroughly and to mix it effectively with the liquid fuel. The resultant vapors above the fuel body level are thoroughly commingled in their passage through screen 39 and are thoroughly heated and expanded by the heat from space 14 as they pass up through chamber 8 and space 53 above the same, to pipe 25.

It will thus be obvious that my improved carbureter comprises especially simple, compact and efficient means for effecting the purpose of my invention. Space 14 completely surrounds fuel tank 6 except above chambers 7 and 8, and these chambers are heated to a high degree of temperature by the adjacent portions of chamber 14 forming the sides of chambers 7 and 8 and the bottoms of the communicating chambers 53 and 54 directly above the same.

As it is sometimes desirable to vary the richness of the mixture passing to pipe 25, I provide the valve-controlled aperture 40 through wall 26. Pipe section 41 inserted therein opens into air chamber 7 which is heated from space 14. Valve 42 within pipe section 41 may be controlled from pedal 43 secured to rod 44 or in any suitable way. By the operation of pedal 43 valve 42 may be opened or closed to vary the quantity of pre-heated air delivered into the gaseous mixture above screen 39, or, if preferred, to cut off the supply of mixture-diluting air altogether.

Fuel is supplied to tank 6 through pipe 45 and may be automatically controlled by a float 46 vertically movable on rod 47 and provided with shut off portion 48 adapted to engage in valve seat 49 between inlet 50 and pipe 45, all as clearly shown in Fig. 4.

What I claim is:—

In a carbureter, the combination of an oil chamber, a chambered body entirely inclosing said oil chamber and providing a passage for the exhaust gases, said passage entirely surrounding the sides, bottom and greater portion of the top of the oil chamber, said chambered body also providing an outlet passage for gas and an inlet passage for air, a valve for establishing communication between said two passages, a partition in said oil chamber forming a passage in communication with the air inlet and extending downwardly close to and parallel with the vertical wall of the oil chamber and terminating near the bottom thereof.

GERRIT VAN DAAM.

Witnesses:
CLIFFORD NICHOLS,
M. G. SMITH.